United States Patent
Tsuie et al.

(10) Patent No.: US 7,751,514 B2
(45) Date of Patent: Jul. 6, 2010

(54) SYSTEM AND METHOD OF DETECTING BURST NOISE AND MINIMIZING THE EFFECT OF BURST NOISE

(75) Inventors: Yih-Ming Tsuie, Hsinchu (TW);
Ming-Luen Liou, Taipei County (TW);
Chien-Huei Lin, Taichung (TW);
Chih-Hung Lin, Changhua County (TW); Wei-Tsen Lin, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 652 days.

(21) Appl. No.: 11/752,440

(22) Filed: May 23, 2007

(65) Prior Publication Data

US 2008/0291992 A1 Nov. 27, 2008

(51) Int. Cl.
*H04B 1/10* (2006.01)
*H03D 3/24* (2006.01)
(52) U.S. Cl. ..................... 375/350; 375/376
(58) Field of Classification Search ............. 375/232, 375/327, 350, 376; 329/307, 308, 325
See application file for complete search history.

(56) References Cited

U.S. PATENT DOCUMENTS

| | | | | |
|---|---|---|---|---|
| 4,691,176 A * | 9/1987 | Hsiung et al. | ............ | 331/2 |
| 5,434,886 A * | 7/1995 | Kazawa et al. | ............ | 375/262 |
| 5,548,839 A * | 8/1996 | Caldwell et al. | ........... | 455/313 |
| 6,151,690 A * | 11/2000 | Peeters | ................ | 714/701 |
| 6,647,069 B1 * | 11/2003 | Segal et al. | ............ | 375/278 |
| 7,089,476 B2 * | 8/2006 | Cayla | .............. | 714/748 |
| 2004/0091069 A1 * | 5/2004 | Liu et al. | ............ | 375/350 |
| 2007/0047511 A1 * | 3/2007 | Mesecher et al. | ......... | 370/342 |

* cited by examiner

*Primary Examiner*—Don N Vo
(74) *Attorney, Agent, or Firm*—Thomas, Kayden, Horstemeyer & Risley

(57) ABSTRACT

A communication system and a method which can reduce the effect of burst noise. The communication system comprises a controllable oscillator, a mixer, a decision circuit, a comparator, a loop filter, and a controller. The controllable oscillator generates an oscillating signal. The mixer coupled to the controllable receives input data and mixes the input data with the oscillating signal. The decision circuit receives the mixed input data and generates an estimated symbol. The comparator generates a decision error between the estimated symbol and the mixed input data. The loop filter coupled to the controllable oscillator filters the decision error, and generates a filtered decision error, and the controllable oscillator generates the oscillating signal according to the filtered decision error. The controller reduces a bandwidth of the loop filter according to the decision error.

25 Claims, 12 Drawing Sheets

SYSTEM AND METHOD OF DETECTING BURST NOISE AND MINIMIZING THE EFFECT OF BURST NOISE

BACKGROUND OF THE INVENTION

Field of the Invention

The invention relates to data communication, and, more particularly, to techniques of detecting burst noise in data communication channels and preventing data distorted by burst noise.

Communications systems are used to transfer data between remote transmitting and receiving locations over one or more physical channels. The integrity and reliability of such data transmissions can be compromised by several factors, such as transmission imperfections, receiving imperfections, and physical channel interference. Examples of interference which affect the quality and rate of data transmission include burst noise (or impulses). Burst noise can be caused by many uncontrollable events, such as arcing and electrical transients coupled through a power system, lightning, and the like. This type of noise consists of powerful bursts of random noise, typically occurring at unexpected times, and lasts for a relatively short period of time (on the order of several microseconds).

To minimize the effect of burst errors, many communication systems apply an interleaver in the transmitter and a corresponding de-interleaver in the receiver. For this reason, when burst noise is generated, the influence of the noise is dispersed in the transmission signal and complete interruption of data transmission can be prevented.

In some communication systems, however, several processing units in the receiving ends do not make use deinterleaving. For example, in next generation digital television systems cable transported television (CATV) and Digital Video Broadcast for Cable (DVB-C) adopted in Europe, received data is first demodulated, deinterleaved, and then decoded. At the demodulating stage of a receiving end, it becomes impossible to prevent burst noise damage to the transmitted data. Moreover, burst noise which penetrates un-demodulated transmitted data leaves the deinterleaver and channel decoder unable to provide sufficient robustness against burst noise.

BRIEF SUMMARY OF THE INVENTION

Accordingly, a communication system which can reduce the effects of burst noise is provided. The communication system comprises a controllable oscillator, a mixer, a decision unit, a comparator, a smoother, and a controller. The controllable oscillator generates an oscillating signal. The mixer coupled to the controllable oscillator receives input data and mixes the input data with the oscillating signal. The decision circuit receives the mixed input data and generates an estimated symbol. The comparator generates a decision error between the estimated symbol and the mixed input data. The loop filter coupled to the controllable oscillator filters the decision error, and generates a filtered decision error, and the controllable oscillator generates the oscillating signal according to the filtered decision error. In some embodiments of the invention, the system further comprises an equalizer coupled with the mixer and the decision circuit.

Two mechanisms of detecting burst noise are provided. One is calculating a short-term SNR according to the decision error, and the other is detecting high level noise, which can be mapped outside of a particular range. In some embodiments of the invention, both mechanisms are applied to detect burst noise. In other embodiments of the invention, only one mechanism is applied to detect burst noise. Once burst noise is detected, the controller reacts to prevent data being corruption. There are two reactions the controller may take: one is to reduce a bandwidth of the loop filter, the other is stop or retard updating coefficients of the equalizer.

A demodulating method for reducing the effect of burst noise is also provided. The method comprises generating an oscillating signal. The oscillating signal is mixed with the input data. The mixed input data is mapped to an estimated symbol. A decision error between the estimated symbol and the mixed input data is generated. The decision error is filtered according to bandwidth, and the oscillating signal is generated according to the filtered decision error. A short-term SNR is calculated, and a high level noise signal is detected. Once the short-term SNR falls below a predetermined SNR, or the high level noise is activated, the bandwidth is narrowed.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the present invention.

DETAILED DESCRIPTION OF THE INVENTION

Figure 1:
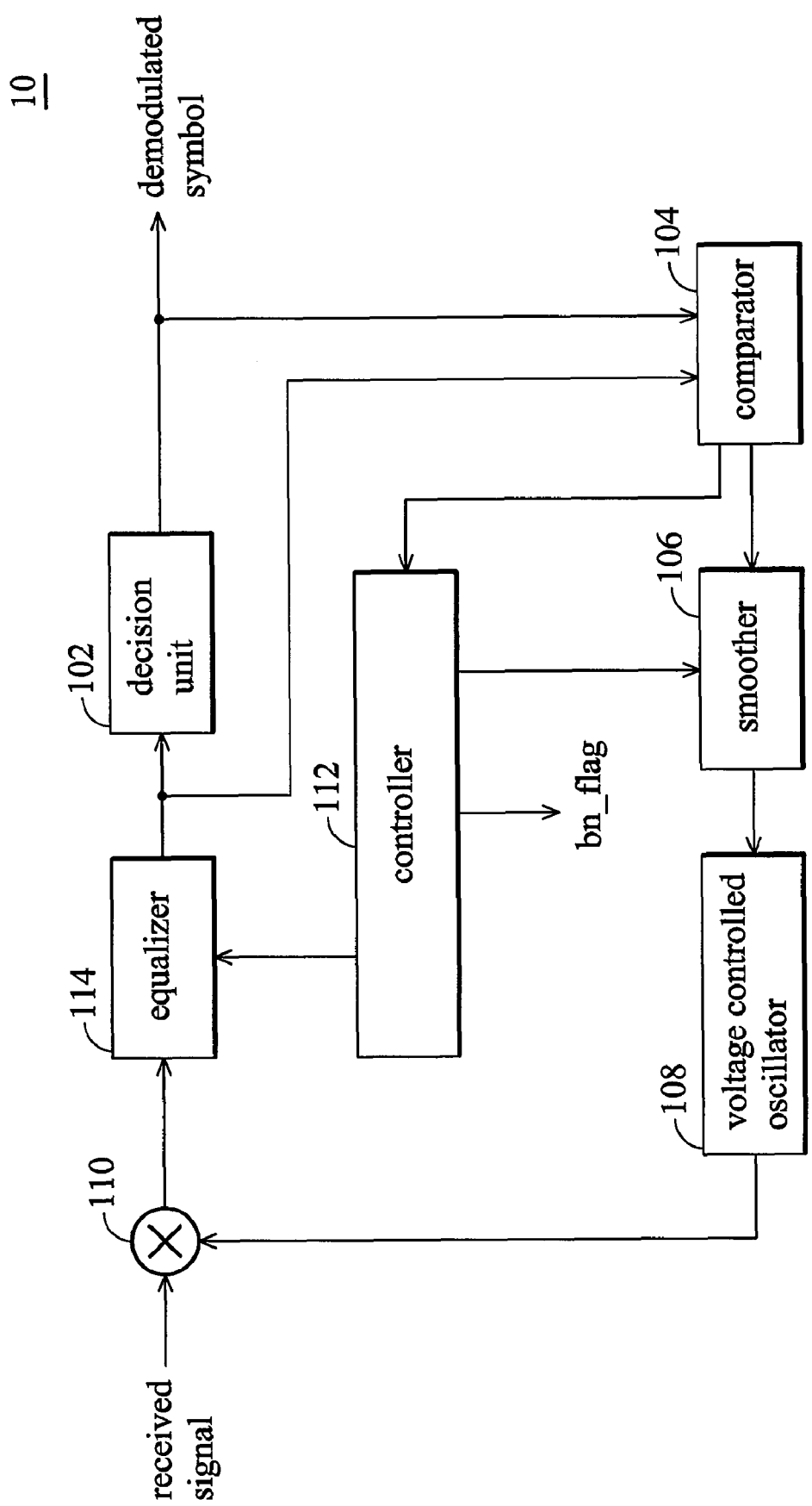
FIG. 1 shows a block diagram of a demodulator.
Figure 2:
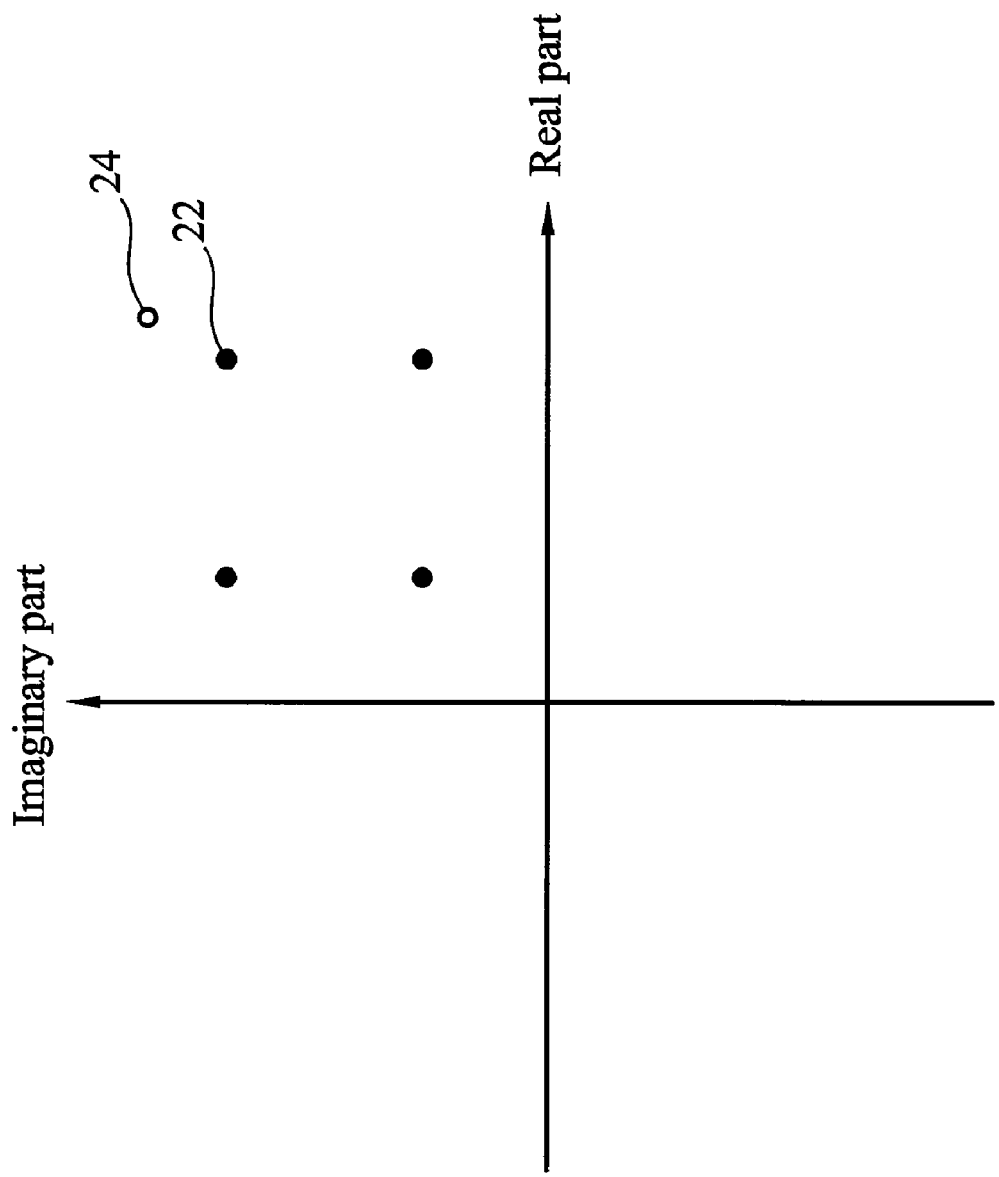
FIG. 2 shows an example of decision symbols.
Figure 3:
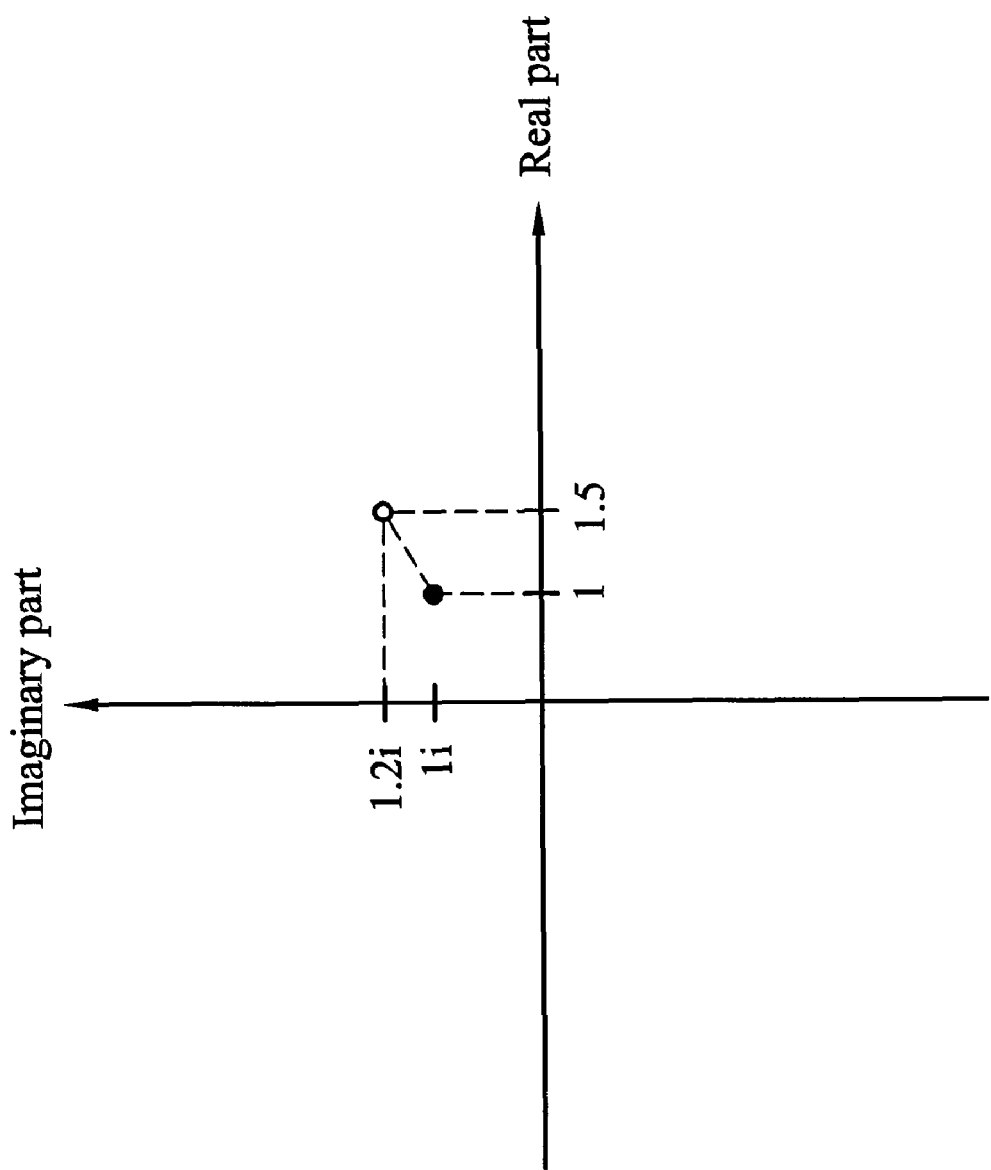
FIG. 3 shows a plot of a symbol transmitted and the correspondingly received symbol.
Figure 4:
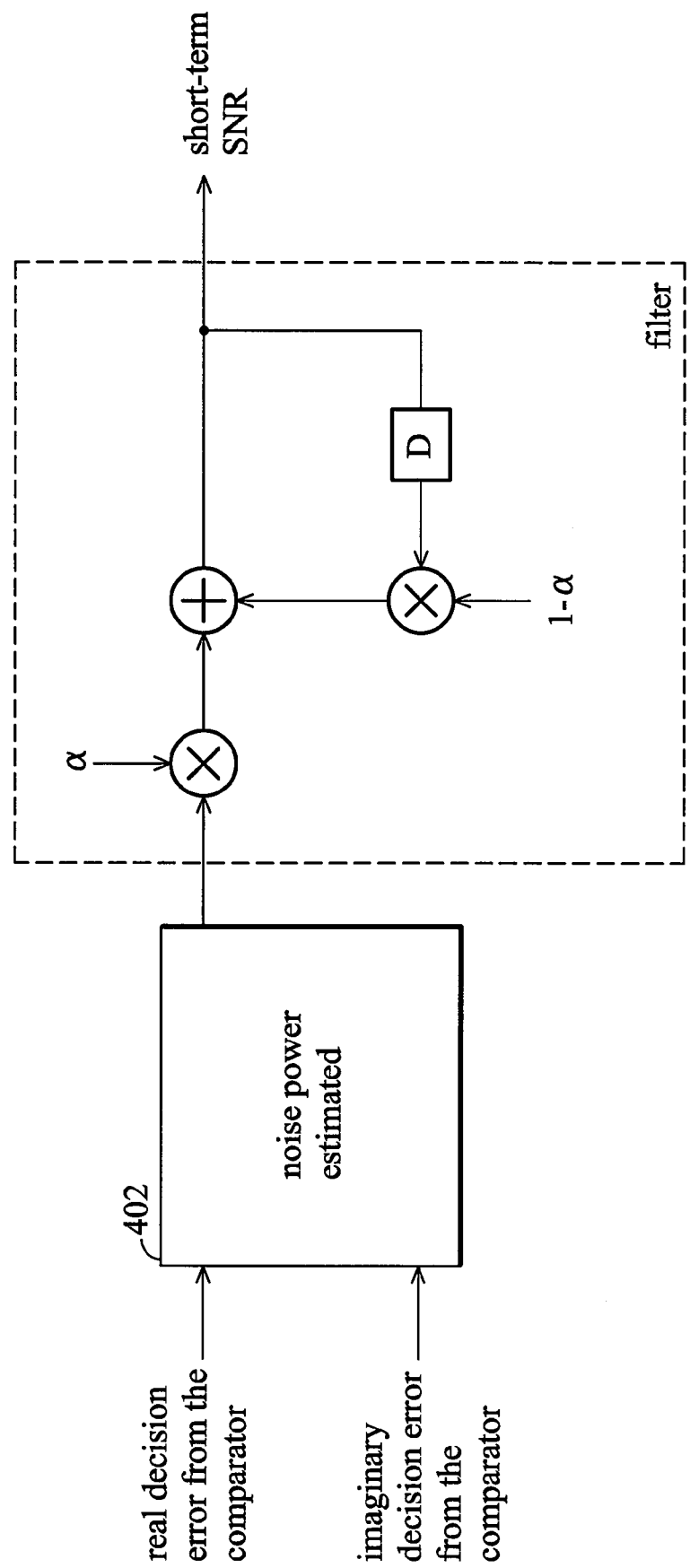
FIG. 4 shows a block diagram of the controller.

FIG. 1 shows a block diagram of a demodulator 10. The decision unit 102 receives an equalized symbol and generates an output decision. FIG. 2 shows an example of deciding symbols. A received symbol is represented by circle 24, and transmitted symbol are plotted as dots 22. The decision circuit 102 maps the equalized symbol into a constellation, and decides the most possible symbols according to the constellation. The decision circuit can be implemented in a hardware circuit and/or related program codes executed by a controller or a processor. In a preferred embodiment, the constellation is 2-dimensional. In other words, demodulators of QAM, QPSK or other demodulators alike can adopt the described system. The decision is compared with the previous decided symbol by the comparator 104. The decision error estimated by the comparator 104 is sent to a smoother 106, and the filtered difference is sent to a voltage-controlled oscillator (VCO) 108. The smoother 106 is used for smoothing decision error variations. An example of such smoother is a loop filter, which can smooth variation of an input. An oscillating signal generated by the VCO 108 is sent to a mixer 110 to be mixed with the received signal for shifting the received signal to a desired frequency. An exemplary operation performed by the mixer 110 is down converting. As arranged in the example of FIG. 1, the mixer 110 provides frequency offset calculation, i.e. calculating difference between frequency of the VCO 108 at local end and another oscillator frequency at a transmitter end. The controller 112 detects the appearance of burst noise according to a decision error. If burst noise is detected, the controller 112 blocks the burst noise entering the closed-loop system 10. For example, the controller 112 narrows a bandwidth of the smoother because burst noise may be recognized as high frequency noise. The equalizer 114 is optional. In one embodiment of the invention, the equalizer 114 is a decision directed equalizer to compensate time-variant, band-limited channels.

To detect burst noise, in one embodiment of the invention, a short-term SNR is calculated. The controller 112 receives the decision error from the comparator 104, calculates a short-term signal-to-noise ratio (SNR) according to the decision error, and compares the short-term SNR with a predetermined SNR. If the short-term SNR is less than the predetermined SNR, a burst noise is detected. The predetermined SNR is a minimum requirement for the corrective demodulating by demodulator 10. The predetermined SNR is varied with different conditions, thus the value of the predetermined SNR is not limited in the invention. The short-term SNR is calculated from the SNR of recently received symbols. There are various ways to calculate short term SNR. Other ways of combining current SNR and past SNR are also in the scope of the invention. For example, multiplying certain weights to the current SNR and the past SNR respectively and then summing them together can derive a short-term SNR. It is noted that there are different ways to combine two variables, e.g. using arithmetic average or other types of averages.

Figure 5:
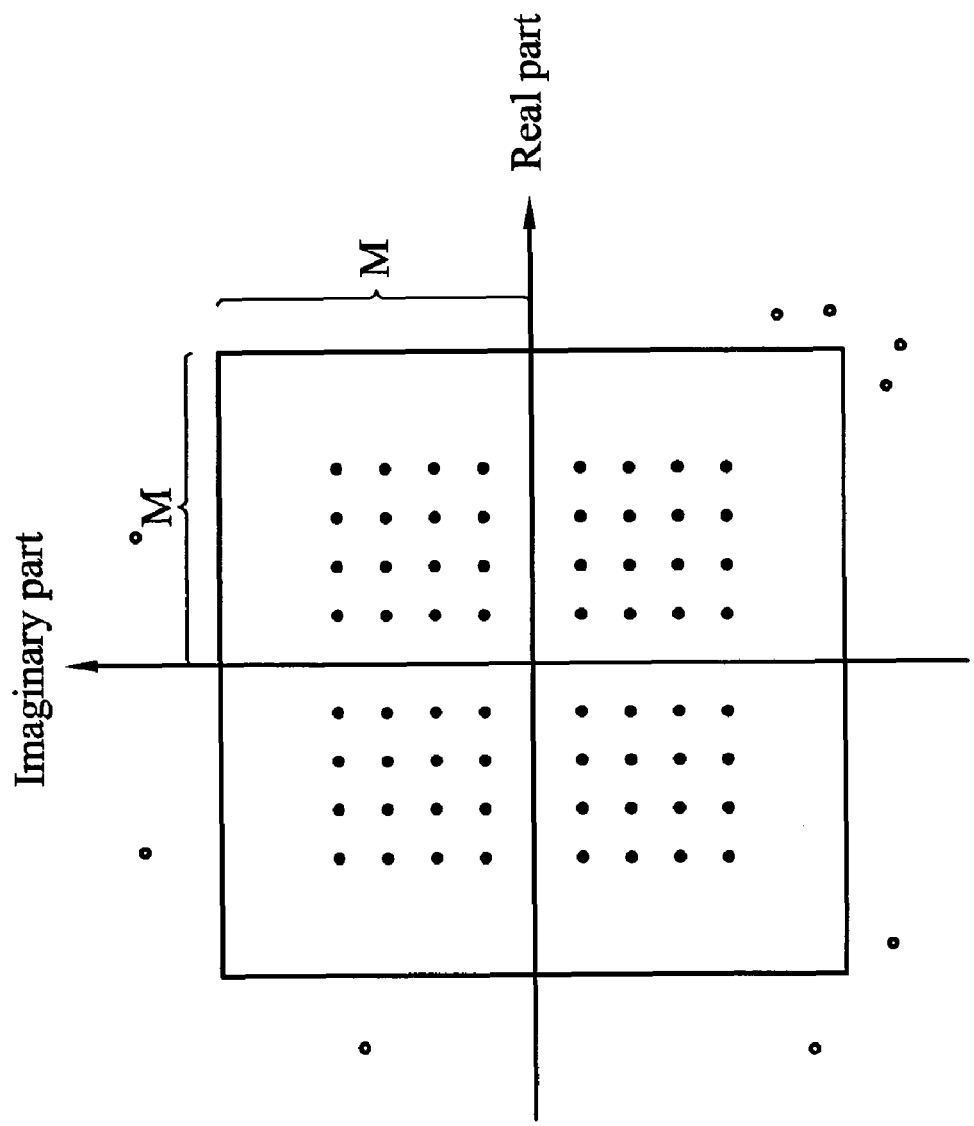
FIG. 5 shows a constellation of QAM symbols.
Figure 6:
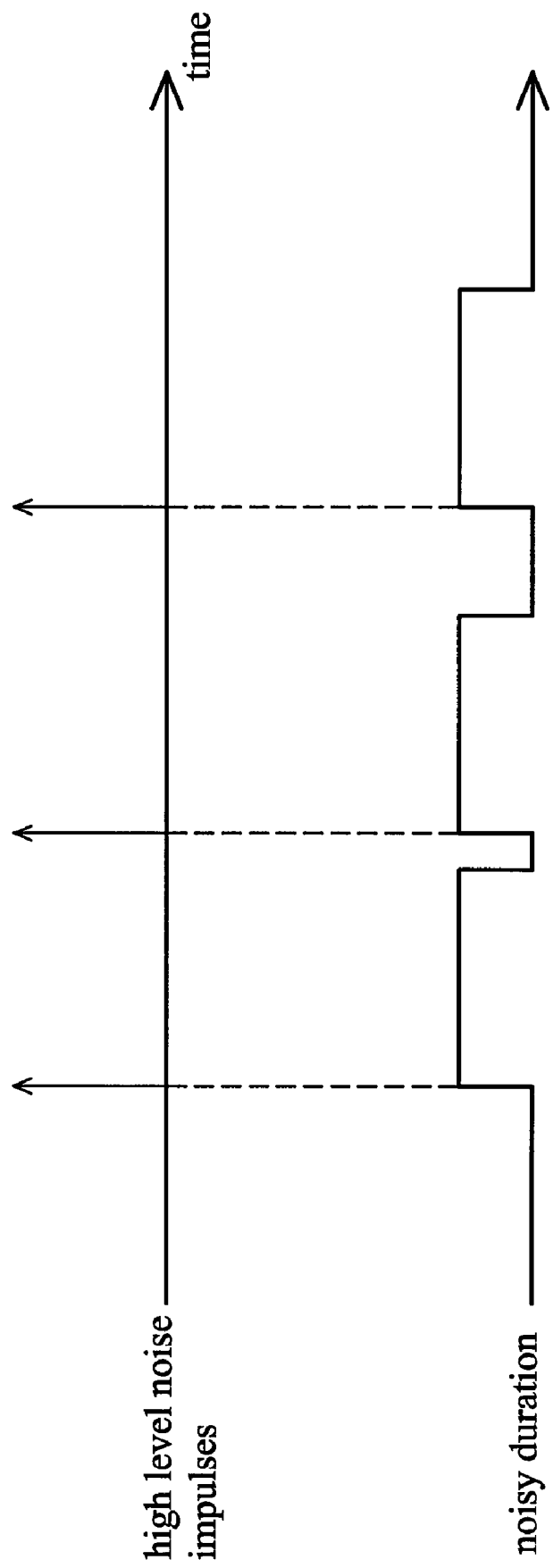
FIG. 6 shows a timing diagram of high level noise impulses and noise duration.

In another embodiment, the burst noise detection is according to observing high level noise. When the real part or imaginary part of the mixed input data exceeds a predetermined margin, a high level noise is detected. FIG. 5 shows a constellation of QAM symbols, while dots represent transmitted symbols. Circles located at the outside of the solid line are regarded as symbols with high level noise. In other words, symbols with real or imaginary part exceed a predetermined margin M is recognized as symbol with high level noise. When a high level noise is detected, a signal indicating noise duration is activated to logic high and lasts for several symbol durations. FIG. 6 shows a timing diagram of high level noise impulses and noise durations. The length of the symbol duration is an experienced value, and can be adjusted according to different environments. In this embodiment of the invention, the duration is 10-symbol duration.

Figure 7:
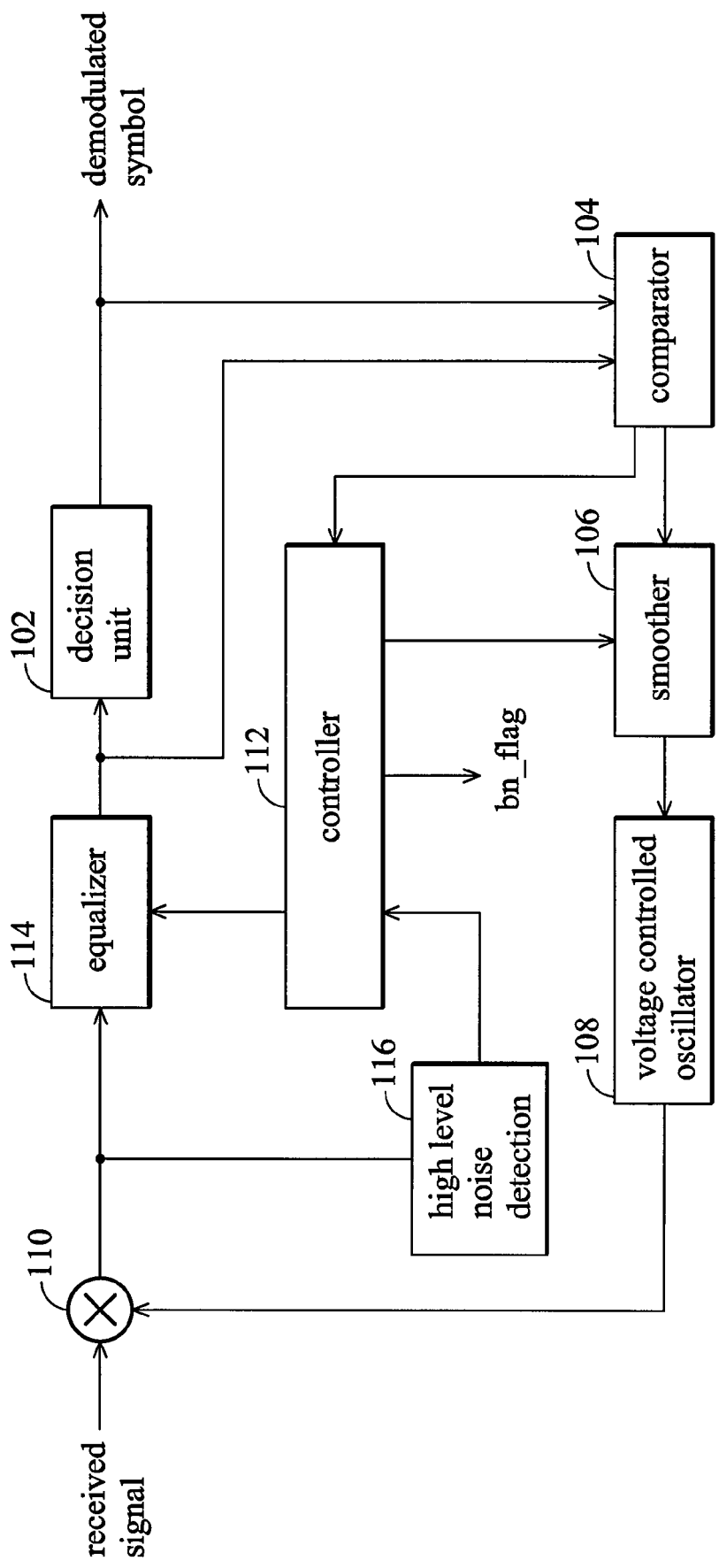
FIG. 7 shows a block diagram of a demodulator applying multiple mechanisms for detecting burst noise.

In a preferred embodiment of the invention, the demodulator 10 applies several mechanisms for detecting burst noise. For example, as shown in FIG. 7, the demodulator not only estimates the short-term SNR, but also observes the noise durations. The high level noise detection 116 is used for detecting high level noise impulse as illustrated in FIG. 6 and such information is provided to the controller 112 as a reference to control the equalizer 114.

Once the burst noise detected, the controller 112 reacts against the burst noise. In one embodiment of the invention, the reaction is to narrow the bandwidth of the loop filer 106. In another embodiment of the invention, the reaction is to stop or retard updating the coefficients of the equalizer 114 in FIG. 1. In yet another embodiment of the invention, both reactions are adopted to avoid burst noise damage to the close-loop system 10. Since the coefficients of decision directed equalizers are adapted to time-variant channel characteristics, burst noise usually let an equalizer trained falsely. Frozen or retarded updating of the coefficients may prevent unwanted random changes in coefficient values before the actual useful equalization process begins; thus, the impact of burst noise can be alleviated. Furthermore, since burst noise are usually high frequency spurs, narrowing the bandwidth of loop filter 106 can also reduce the affect of burst noise.

Figure 8:
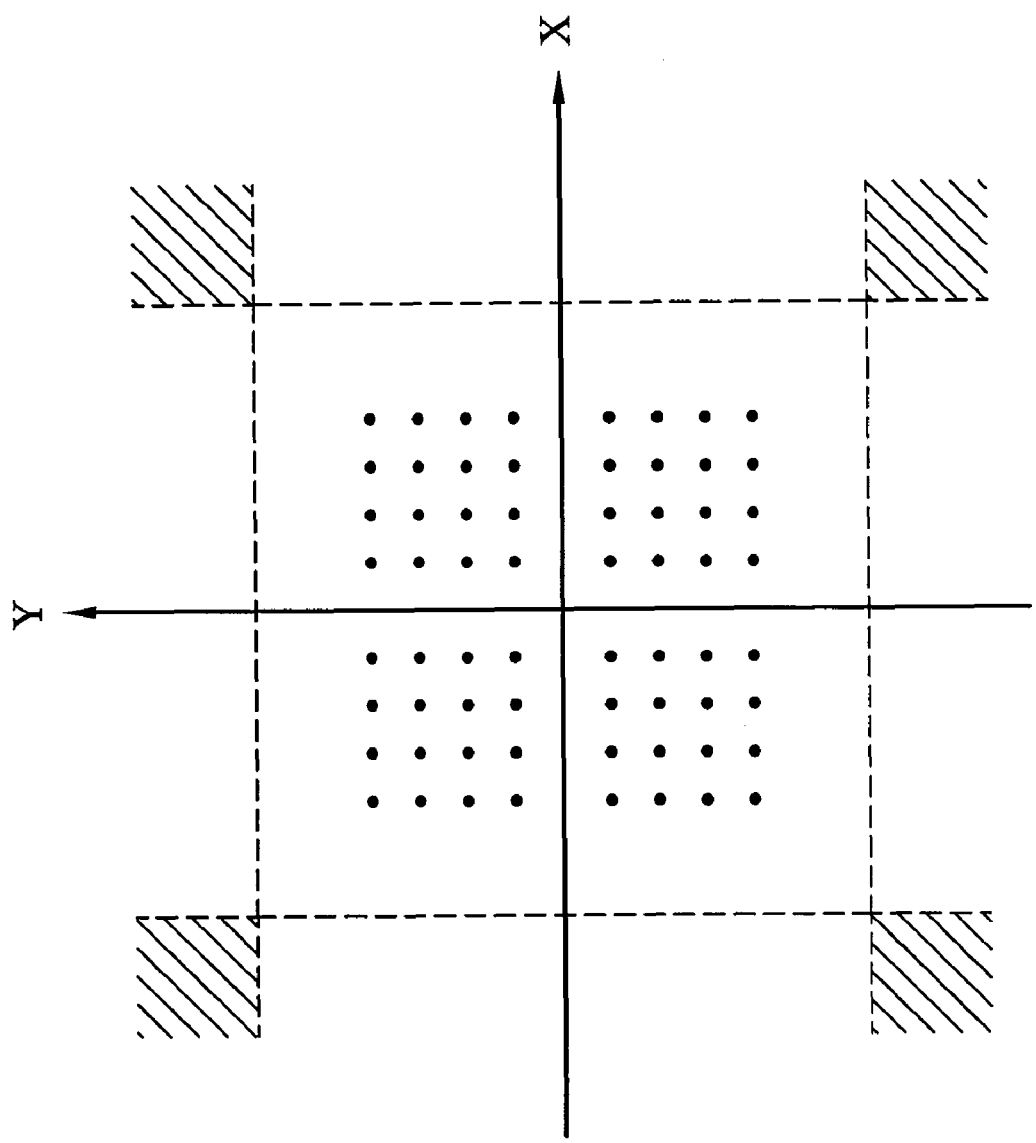
FIG. 8 shows a constellation of QAM symbols with a large noise region marked.
Figure 9:
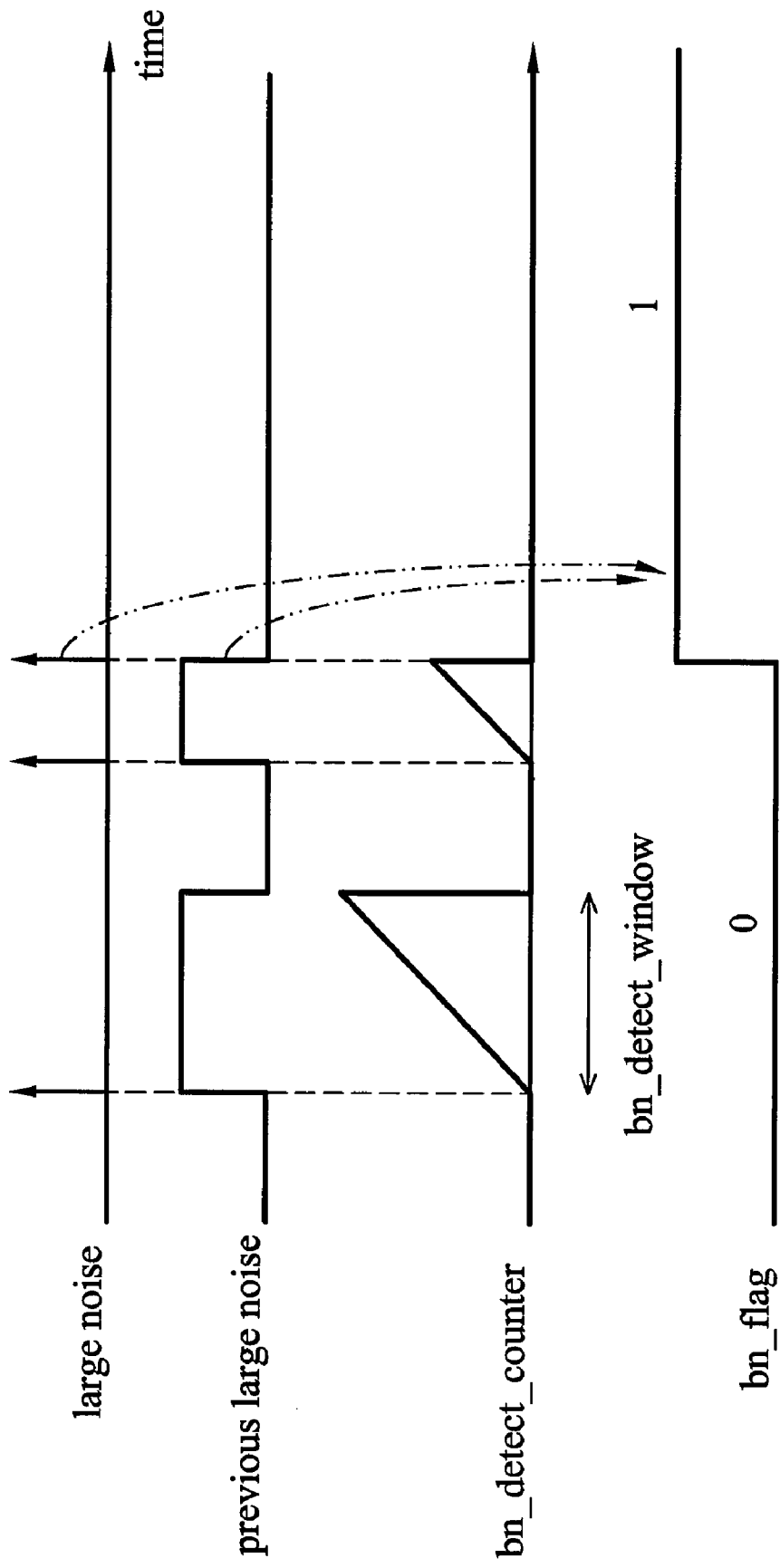
FIG. 9 shows a time diagram of the burst noise flag.

In another embodiment of the invention, a burst noise flag is activated when the burst noise is large enough. FIG. 8 shows a constellation of QAM symbols with the large noise region marked. The dots represent the transmitted symbol, and any received symbol mapped in the shadowed area is regarded as a symbol with large noise. A large noise impulse is alerted when a symbol with large noise is received. A counter is trigged when a large noise impulse is alerted. If any succeeding large noise impulse occurring before the counter counts to a predetermined value, a burst noise flag is set as logic high, otherwise, the burst noise flag is as logic low. FIG. 9 shows a time diagram of the burst noise flag (bn_flag). After detecting a large noise, a counter is triggered. If there is more than one other large noise occurring in a detecting window, the burst noise is activated.

Figure 10:
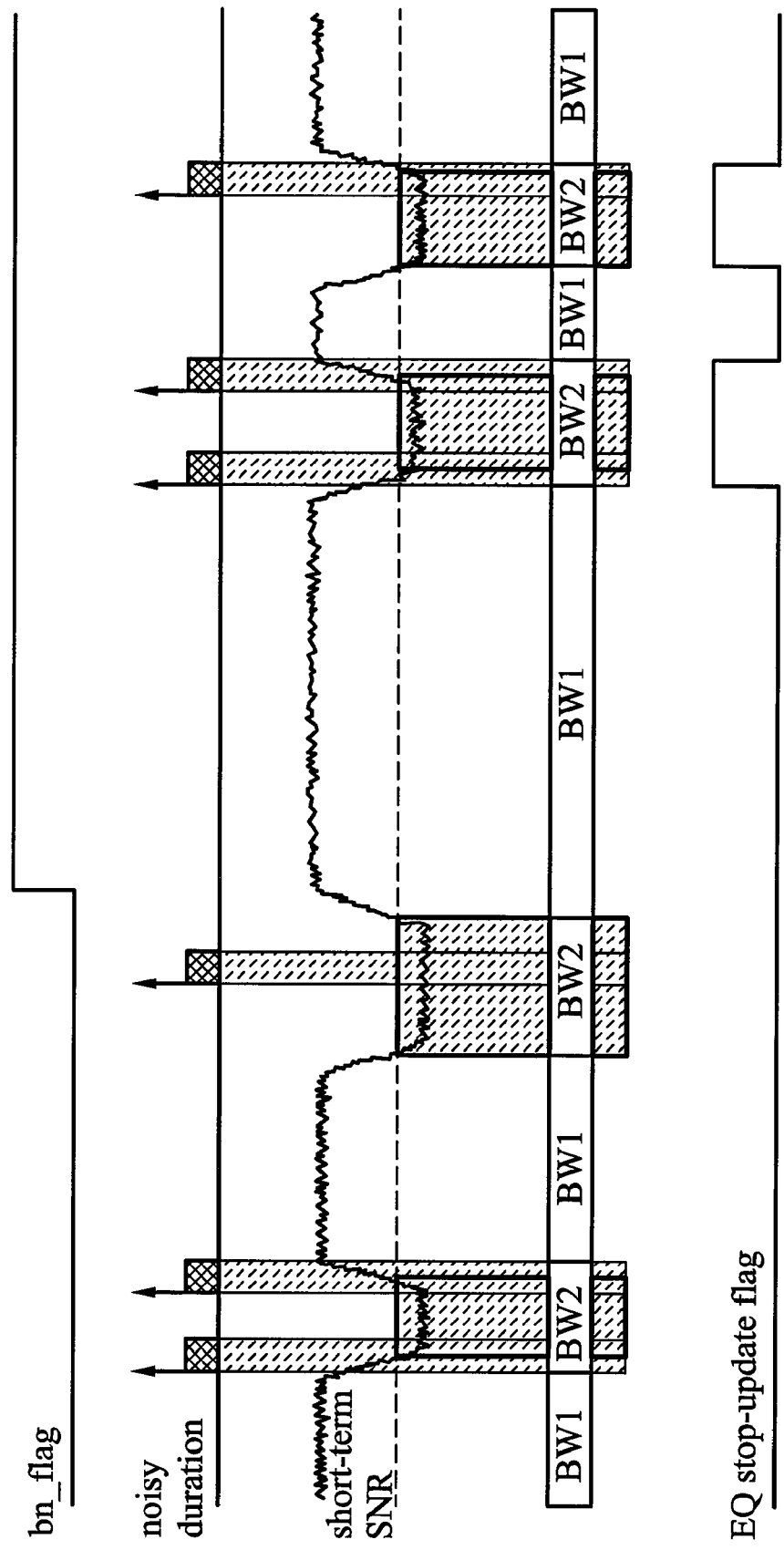
FIG. 10 shows a timing diagram of the noise duration, short-term SNR signal, and the burst noise flag.

FIG. 10 shows a time diagram of the noise durations, short-term SNR signal, and the burst noise flag. The noise duration responds to high level noise immediately, but the noise durations are activated occasionally, which means, not every burst noise triggers a noise duration. The short-term SNR signal responds slower than the noise durations, but the short-term SNR steadily activate the occurrence of burst error. In this embodiment of the invention, the union of duration time and low SNR indicates that burst noise is detected. When the noise duration and short-term SNR are both activated, the bandwidth of the loop filter is narrowed from BW1 to BW2. Once the burst noise flag is activated, the coefficients of the equalizer 114 stop updating at the union of duration time and low short-term SNR.

Figure 11:
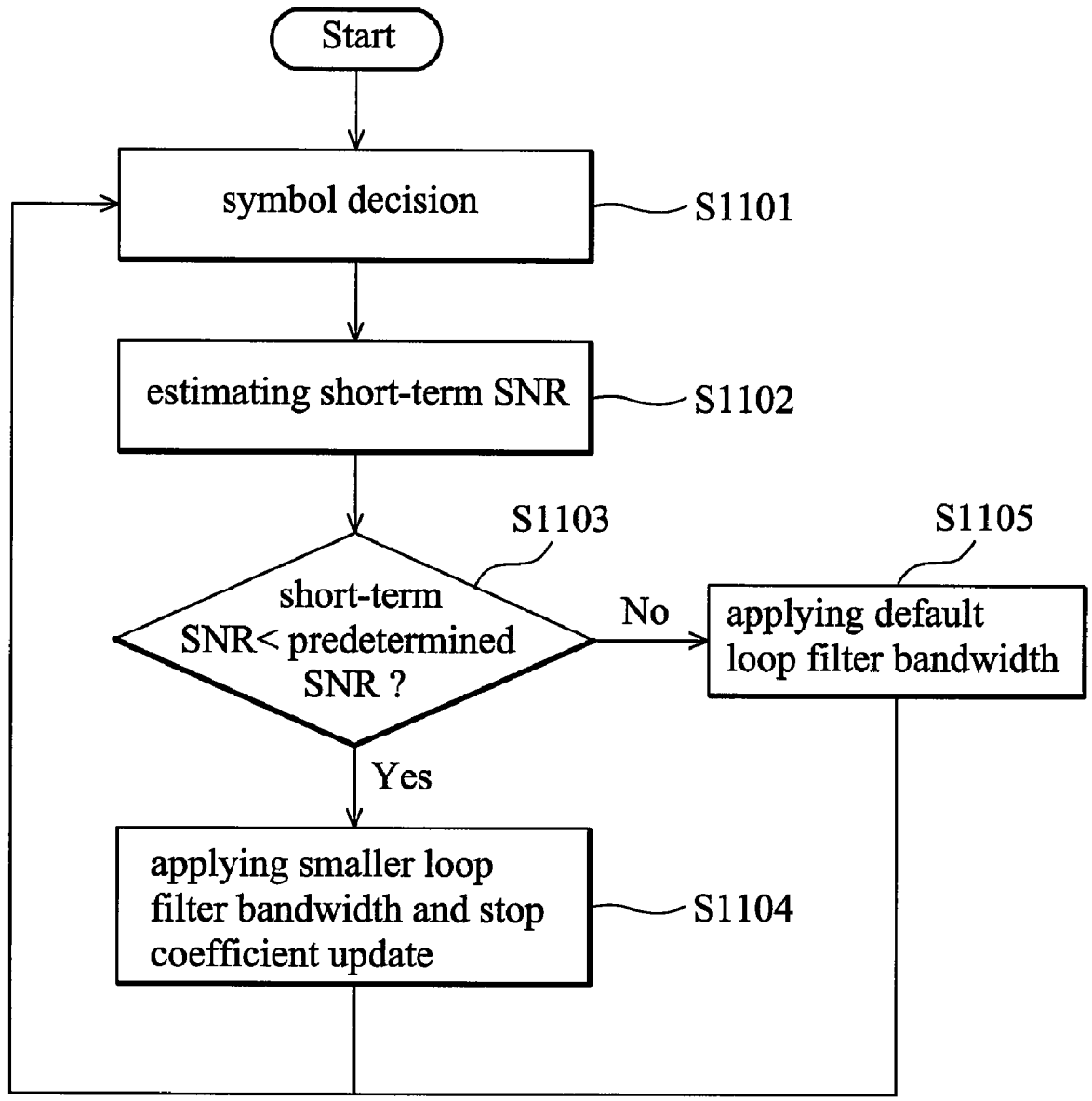
FIG. 11 shows the flowchart of controlling burst noise.

FIG. 11 shows the flowchart of controlling the burst noise. The method of controlling the burst noise is used in a system comprising a comparator, a loop filter, and a VCO. In step S1101, received signals are sliced to a symbol The difference between the sliced symbol and received signals are calculated. A short-term SNR is estimated according to the slice error in step S1102. The short-term SNR is compared with a predetermined SNR in step S1103. In step S1104, if the short-term SNR is less than the predetermined SNR, a bandwidth with of the loop filter is narrowed. If the short-term SNR exceeds or equals the predetermined SNR, the default bandwidth of the loop filter is used in step S1105. In some embodiments of the invention, when the short-term SNR exceeds or equals the predetermined SNR, but a high level noise is detected in step S1103, the bandwidth of the loop filter is narrowed.

Figure 12:
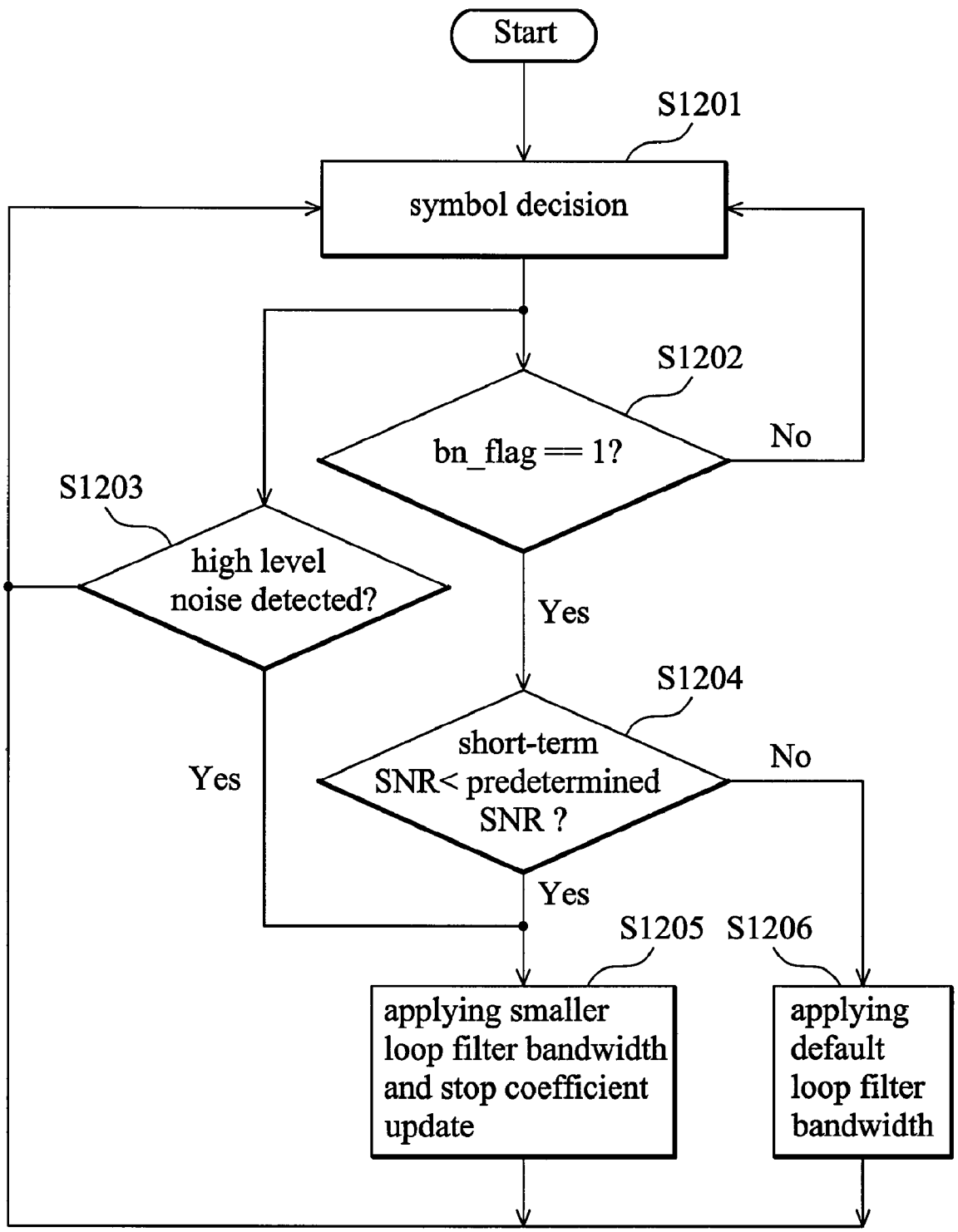
FIG. 12 shows another flowchart of controlling burst noise.

FIG. 12 shows another flowchart of controlling burst noise. The method begins with slicing received signals to a most likely symbol in step S1201. A burst noise flag (bn_flag) is checked in step S1202. If the burst noise is activated, a short-term SNR is compared with a predetermined SNR in step S1204. The method continues to detect the next symbol if burst noise flag is not activated. In step S1204, if the short-term SNR is less than a predetermined SNR, the bandwidth of a loop filter is narrowed in step S1205. If the short-term SNR exceeds or equals the predetermined SNR, the loop filter keeps default bandwidth in step S1206. Another condition which also invokes step S1205 is when a high level noise is detected in step S1203. The burst noise flag is activated when a sliced symbol is mapped to a large noise region as shown in FIG. 8.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication system comprising:
a controllable oscillator generating an oscillating signal;
a mixer coupled to the controllable oscillator, wherein the mixer receives input data and mixes the input data with the oscillating signal;
a decision unit receiving the mixed input data and generating an estimated symbol;
a comparator generating a decision error between the estimated symbol and the mixed input data;
a smoother coupled to the controllable oscillator filtering the decision error, and generating a filtered decision error, and the controllable oscillator generates the oscillating signal according to the filtered decision error; and
a controller adjusting a bandwidth of the smoother according to the decision error.

2. The communication system as claimed in claim 1 further comprising an equalizer coupled to the mixer and the decision circuit, wherein the decision circuit receives the equalized input data and generating an estimated symbol, and the controller adjusts coefficients of the equalizer according to the decision error.

3. The communication system as claimed in claim 2, wherein the adjustment by the controller of the coefficients stops updating the coefficients.

4. The communication system as claimed in claim 2, wherein the adjustment by the controller of the coefficients reduces the rate of updating the coefficients.

5. The communication system as claimed in claim 1, wherein controller further generates a short-term SNR according to the decision error, compares the short-term SNR with a predetermined SNR, and reduces the bandwidth of the loop filter when the short-term SNR is less than the predetermined SNR.

6. The communication system as claimed in claim 5, wherein the short-term SNR is generated according to the decision error of the estimated symbol and an SNR of previous decision errors.

7. The communication system as claimed in claim 5 further comprising a high level noise detector, wherein the controller reduces the bandwidth of the loop filter when a high level noise is detected and the short-term SNR is less than the predetermined SNR.

8. The communication system as claimed in claim 5, wherein the controller further generating a burst noise flag, when the real part and the imaginary part of the mixed input data exceeds a predetermined margin, the controller activates the burst noise flag.

9. The communication system as claimed in claim 8, when the burst noise flag is activated and the short-term SNR is less than the predetermined SNR, the controller reduces the bandwidth of the loop filter according to the decision error.

10. The communication system as claimed in claim 1, wherein the decision unit is a hardware circuit and/or related program codes executed by a controller or a processor.

11. The communication system as claimed in claim 10, wherein the high level noise detector detects the mixed input data, and when the real part or imaginary part of the mixed input data exceeds a predetermined margin, a high level noise is detected.

12. The communication system as claimed in claim 11, wherein the high level noise detector further outputs a signal indicating noise duration when a high level noise is detected, the noise duration is activated and lasts a plurality of symbol duration, and the controller reduces the bandwidth of the loop filter when the noise duration is activated and the short-term SNR is less than the predetermined SNR.

13. The communication system as claimed in claim 12, wherein the controller further generating a burst noise flag, when the real part and the imaginary part of the mixed input data exceeds a predetermined margin, the controller activates the burst noise flag, and the controller reduces the bandwidth of the loop filter when the burst noise flag is activated, the short-term SNR is less than the predetermined SNR, and the noise duration is activated.

14. A demodulating method, comprising:
generating a oscillating signal;
receiving input data and mixing the input data with the oscillating signal;
mapping the mixed input data to an estimated symbol;
generating a decision error between the estimated symbol and the mixed input data;
filtering the decision error according to a bandwidth, and generating the oscillating signal according to the filtered decision error; and
adjusting the bandwidth according to the decision error.

15. The demodulating method as claimed in claim 14, further comprising
equalizing the mixed input data and then mapping the equalized data to an estimated symbol; and
adjusting coefficients of the equalizer according to the decision error.

16. The demodulating method as claimed in claim 15, wherein the adjustment of the coefficients stops updating the coefficients.

17. The demodulating method as claimed in claim 15, wherein the adjustment of the coefficients reduces the rate of updating the coefficients.

18. The demodulating method as claimed in claim 14, further comprising:
generating a short-term SNR according to the decision error;
comparing the short-term SNR with a predetermined SNR, and reducing the bandwidth when the short-term SNR is less than the predetermined SNR.

19. The demodulating method as claimed in claim 18, wherein the short-term SNR SNR(n) is generated according to the decision error of the estimated symbol and a SNR of previous decision errors SNR(n−1).

20. The demodulating method as claimed in claim 18, further comprising detecting high level noises of the mixed input data, and reducing the bandwidth when a high level noise is detected and the short-term SNR is less than the predetermined SNR.

21. The demodulating method as claimed in claim 20, wherein the high level noises are the real part or imaginary part of the mixed input data exceeds a predetermined margin.

22. The demodulating method as claimed in claim 21, further comprising generating a signal indicating noise duration when a high level noise is detected, the noise duration is activated and lasts for a plurality of symbol durations, and reducing the bandwidth when the noise duration is activated and the short-term SNR is less than the predetermined SNR.

23. The demodulating method as claimed in claim 22, further comprising:
   generating a burst noise flag;
   activating the burst noise flag when the real part and the imaginary part of the mixed input data exceeds a predetermined margin; and
   reducing the bandwidth of the loop filter when the burst noise flag is activated, the short-term SNR is less than the predetermined SNR, and the noise duration is activated.

24. The demodulating method as claimed in claim 18, further comprising generating a burst noise flag; and
   activating the burst noise flag when the real part and the imaginary part of the mixed input data exceeds a predetermined margin.

25. The demodulating method as claimed in claim 24, wherein the bandwidth is reduced according to the decision error when the burst noise flag is activated and the short-term SNR is less than the predetermined SNR.

* * * * *